United States Patent
Wakai

(10) Patent No.: US 10,927,872 B2
(45) Date of Patent: Feb. 23, 2021

(54) PLATE NUT ASSEMBLY

(71) Applicant: WAKAI HOLDINGS CO., LTD., Osaka (JP)

(72) Inventor: Takemasa Wakai, Osaka (JP)

(73) Assignee: Wakai Holdings Co., Ltd., Osaka (JP)

( * ) Notice: Subject to any disclaimer, the term of this patent is extended or adjusted under 35 U.S.C. 154(b) by 263 days.

(21) Appl. No.: 16/173,460

(22) Filed: Oct. 29, 2018

(65) Prior Publication Data
US 2019/0128302 A1 May 2, 2019

(30) Foreign Application Priority Data
Oct. 30, 2017 (JP) .............................. JP2017-209211

(51) Int. Cl.
*F16B 13/08* (2006.01)
*F16B 37/02* (2006.01)
*F16B 37/04* (2006.01)

(52) U.S. Cl.
CPC .......... *F16B 13/0808* (2013.01); *F16B 37/02* (2013.01); *F16B 37/048* (2013.01); *F16B 13/08* (2013.01)

(58) Field of Classification Search
CPC ...... F16B 13/08; F16B 13/0808; F16B 37/02; F16B 37/048
USPC .......................................... 411/340, 344, 345
See application file for complete search history.

(56) References Cited

U.S. PATENT DOCUMENTS

| | | | | |
|---|---|---|---|---|
| 3,211,042 A * | 10/1965 | Fischer | ............... | F16B 13/0808 411/344 |
| 3,605,547 A * | 9/1971 | Millet | ..................... | F16B 37/04 411/344 |
| 4,439,079 A * | 3/1984 | Losada | ............... | F16B 13/0808 24/16 PB |
| 4,865,501 A * | 9/1989 | Ferris | .................. | F16B 13/0808 411/340 |
| 6,196,506 B1* | 3/2001 | Wakai | ..................... | F16B 37/02 248/216.1 |
| 6,287,065 B1* | 9/2001 | Berlin | ..................... | F16B 37/00 411/340 |
| 6,669,420 B2* | 12/2003 | Ikuta | .................. | F16B 13/0808 411/340 |

(Continued)

FOREIGN PATENT DOCUMENTS

JP 10-306818 11/1998
JP 2002-317808 10/2002

*Primary Examiner* — Roberta S Delisle
(74) *Attorney, Agent, or Firm* — Wenderoth, Lind & Ponack, L.L.P.

(57) ABSTRACT

The present invention provides a plate nut assembly including a nut having a threaded hole; and a tab including a bifurcated portion and a fixed portion. A nut insertion hole is formed in a hollow member such that the diameter of the nut insertion hole is larger than the transverse width of the nut. By bending the tab, the nut can be located inside of the inner surface of the hollow member with the threaded hole opposed to the nut insertion hole. The transverse width of the bifurcated portion of the tab is larger than the transverse width of nut. When the nut is inserted through the nut insertion hole until the nut is located inside of the inner surface of the hollow member, the outer side edges of the bifurcated portion in its transverse width direction come into contact with the nut insertion hole.

4 Claims, 5 Drawing Sheets

(56) References Cited

U.S. PATENT DOCUMENTS

| | | | |
|---|---|---|---|
| 6,679,664 B2 * | 1/2004 | Ikuta | F16B 13/0808 411/346 |
| 6,821,069 B2 * | 11/2004 | Ikuta | F16B 13/0808 411/340 |
| 7,736,108 B1 * | 6/2010 | Bruce | F16B 13/0808 411/346 |
| 2002/0154964 A1 | 10/2002 | Ikuta | |
| 2003/0118420 A1 * | 6/2003 | Ikuta | F16B 13/0808 411/15 |
| 2018/0252250 A1 * | 9/2018 | Daly | F16B 13/0808 |
| 2019/0093694 A1 * | 3/2019 | Wakai | F16B 37/044 |

* cited by examiner

US 10,927,872 B2

PLATE NUT ASSEMBLY

CROSS REFERENCE TO RELATED APPLICATION(S)

This application is based on and claims priority under 35 U.S.C. sctn. 119 with respect to Japanese Patent Application No. 2017-209211 filed on Oct. 30, 2017, the entire content of which is incorporated herein by reference.

BACKGROUND OF THE INVENTION

The present invention relates to a plate nut assembly used to fix, by bolt, e.g., a component to the outer surface of a hollow member under the situation that a user cannot make his or her hand reach the inner surface of the hollow member.

Such plate nut assemblies comprise, as disclosed in JP Patent Publications H10-306818 and 2002-317808, a rectangular nut having, at the central portion thereof, a threaded hole extending through the nut in the thickness direction thereof; and a tab fixed to one surface of the nut. The tab is formed of a metal plate having a foldable thickness, and includes a bifurcated portion disposed at its central portion; and a fixed portion connected to the distal ends of the bifurcated portion on both sides thereof, and fixed to the nut.

The fixed and bifurcated portions of the tab are connected together through foldable portions. By fixing the fixed portion to one surface of the nut at one end of the nut, the bifurcated portion can be bent at the foldable portions and separated from the one surface of the nut. The threaded hole of the nut is exposed by a cutout disposed in the top plate of the fixed portion, and an opening disposed inside of the bifurcated portion of the tab.

In order to fix, e.g., a component to the outer surface of a hollow member by use of such a plate nut assembly under the situation that a user cannot make his or her hand reach the inner surface of the hollow member, the user forms, in the hollow member, a nut insertion hole having a diameter set in view of the transverse width of the nut; inserts the nut through the nut insertion hole from its outer end lying on the outer surface of the hollow member while holding the tab of the plate nut assembly; and pulls the tab obliquely upwardly with the entire length of the nut located inside of the inner surface of the hollow member, thereby bringing both ends of the nut in its longitudinal direction into pressure contact with respective portions of the inner surface of the hollow member above and below the nut insertion hole. Thereafter, the user turns the tab downwardly while pulling the tab with the nut prevented from separating from the hollow member; and folds the tab at the foldable portions such that the tap is superposed on the outer surface of the hollow member a.

By sandwiching, in the thickness direction, the hollow member by the nut and the tab in this way, the plate nut assembly is attached to the hollow member. At this time, the nut is located inside of the inner surface of the hollow member with the threaded hole of the nut opposed to the nut insertion hole of the hollow member. Thereafter, by screwing a bot through, e.g., a component and the outer surface of the hollow member into the threaded hole of the nut, and tightening the bolt, the component is fixed to the hollow member.

Unless, when a bolt is screwed into the nut as described above, the nut is firmly (unmovably) attached to the inner surface of the hollow member in a stable manner, it will be difficult to screw the bolt into the threaded hole of the nut. If a user strongly pushes, with the bolt, the portion of the nut around the threaded hole, the nut will be inclined, and thus the user will have to attach the plate nut assembly to the hollow member again, thereby reducing work efficiency.

Since, for conventional plate nut assemblies, the transverse width of the tab coincides with that of the nut as disclosed in JP Patent publication H10-306818, when the tab and the nut are inserted together through the nut insertion hole having a diameter larger than the transverse width of the nut, relatively large spaces are defined between the inner periphery of the nut insertion hole and the respective side edges of the tab.

If the difference between the transverse width of the tab and the diameter of the nut insertion hole is large in this way, when attaching the plate nut assembly to the hollow member by downwardly pulling and folding the tab so as to be superposed on the outer surface of the hollow member, both side edges of the tab abut against portions of the inner periphery of the nut insertion hole located at a lower level than the center of the nut insertion hole. Since the distance between the contact points at which both side edges of the tab come into contact with the nut insertion hole is much smaller than the diameter of the nut insertion hole, the tab is likely to move in the nut insertion hole in the circumferential direction of the nut insertion hole and in the width direction of the tab, thereby destabilizing the position of the nut.

Namely, if the transverse width of the tab is much smaller than the diameter of the nut insertion hole, with the plate nut assembly attached to the hollow member, i.e., with the tab folded to be superposed on the outer surface portion of the hollow member located at a lower level than the nut insertion hole, the distance between the contact points at which both side edges of the portion of the tab located in the nut insertion hole come into contact with the inner periphery of the prepare hole is small. Therefore, even when the tab is pulled downwardly, the tab is not sufficiently/strongly wedged, at the above contact points, against the inner periphery of the prepare holed, and thus the tab is likely to move in the circumferential direction of the nut insertion hole and in the width direction of the tab, thereby destabilizing the position of the nut with respect to the nut insertion hole. As a result thereof, the nut is less likely to be firmly (unthovably) fixed in position. If the nut is not firmly fixed in position when a bolt is screwed into the threaded hole, it is difficult to screw the bolt into the threaded hole.

At this time, since both side edges of the portion of the tab located in the nut insertion hole abut against portions of the inner periphery of the nut insertion hole located at a lower level than the center of the nut insertion hole, the center of the threaded hole is located below the center of the nut insertion hole. As a result thereof, a mounting error may be generated with respect to the fixation position of a component to be fixed such that the center of the component coincides with the center of the nut insertion hole.

SUMMARY OF THE INVENTION

It is an object of the present invention to provide a plate nut assembly which is capable of being firmly (unmovably) attached to a hollow member; which is configured such that a bolt can be smoothly screwed into the threaded hole of the nut of the plate nut assembly; and with which, e.g., a component can be accurately fixed at a predetermined position in the height direction.

In order to achieve the above object, the present invention provides a plate nut assembly comprising: a nut in a shape of a plate having long sides and short sides, and including, at a central portion of the nut, a threaded hole extending through the nut in a thickness direction of the nut; and a tab located on one surface of the nut, the tab including: a bifurcated portion disposed at a central portion of the tab, and having distal ends on two sides of the bifurcated portion; and a fixed portion integrally connected to the distal ends of the bifurcated portion, and fixed to portions of the nut on two opposite sides of the threaded hole in a transverse width direction of the nut, wherein the plate nut assembly is configured such that, by (i) inserting the nut through a nut insertion hole formed in a hollow member, the nut insertion hole having a diameter smaller than a length of the nut and larger than a transverse width of the nut; and (ii) bending the tab, the nut can be located inside of an inner surface of the hollow member with the threaded hole opposed to the nut insertion hole, wherein a transverse width of the bifurcated portion of the tab is larger than the transverse width of the nut, and wherein the plate nut assembly is configured such that, when the nut is inserted through the nut insertion hole of the hollow member until the nut is located inside of the inner surface of the hollow member, two side edges of the bifurcated portion in a transverse width direction of the bifurcated portion come into contact with an inner periphery of the nut insertion hole.

For the plate nut assembly, the bifurcated portion includes protruding portions including the two side edges of the bifurcated portion, each of the protruding portions protruding outwardly beyond a respective side edge of the nut by a protruding amount α, the protruding amount α being equal to half a difference between the transverse width of the bifurcated portion and the transverse width of the nut, wherein the plate nut assembly is configured such that, with the tab attached to the nut insertion hole, the respective side edge of the nut intersects with the inner periphery of the nut insertion hole at a predetermined point where the tab is fixed to the nut, and wherein the protruding amount α satisfies a relation 1.5α≤ß, where ß is a distance, in plan view seen from a thickness direction of the hollow member, between the predetermined point and a corresponding one of two positions of the tab at which the tab is folded.

For the plate nut assembly, the bifurcated portion includes protruding portions including the two side edges of the bifurcated portion, each of the protruding portions protruding outwardly beyond a respective side edge of the nut by a protruding amount α, the protruding amount α being equal to half a difference between the transverse width of the bifurcated portion and the transverse width of the nut, wherein the plate nut assembly is configured such that, with the tab attached to the nut insertion hole, the respective side edge of the nut intersects with the inner periphery of the nut insertion hole at a predetermined point where the tab is fixed to the nut, and wherein the protruding amount α satisfies a relation 2α≤r, where r is a linear distance, in plan view seen from a thickness direction of the hollow member, between the predetermined point and a position at which a corresponding one of the two side edges of the bifurcated portion comes into contact with the inner periphery of the nut insertion hole.

The tab is formed of a single strip-shaped metal plate, and includes a bifurcated portion disposed at its central portion, and having arms defining therebetween an opening; a wide grip portion connected to the proximal end of the bifurcated portion; and a fixed portion connected through foldable portions to the distal ends of the arms of the bifurcated portion. The fixed portion is a "⊐" (Japanese character)-shaped portion fixedly fitted to the front surface and two side surfaces of the nut at one end thereof. The fixed portion includes a top plate having a U-shaped cutout disposed at the end of the top plate close to the threaded hole so as to expose the threaded hole, and defining, on both sides of the cutout, two distal ends of the top plate that are integrally connected to the distal ends of the respective arms of the bifurcated portion through the foldable portions. The bifurcated portion and the grip portion can be separated from the nut.

Since the fixed portion is a "⊐"-shaped portion fitted to the outer periphery of the nut, the transverse width of the fixed portion is larger than the transverse width of the nut by twice the wall thickness of the fixed portion. On the other hand, the transverse width of the bifurcated portion, which is set based on the transverse width of the nut, is smaller than the diameter of the nut insertion hole of the hollow member, but larger than the transverse width of the fixed portion. Thus, the difference between the diameter of the nut insertion hole and the transverse width of the bifurcated portion is small.

The attachment position of the tab with respect to the nut insertion hole of the hollow member is set such that, after inserting the nut through the nut insertion hole until the nut is located inside of the inner surface of the hollow member, with the center of the threaded hole substantially coinciding with the center of the nut insertion hole, the foldable portions can be located at a slightly lower level than the horizontal (diametrical) line that passes through the center of the nut insertion hole. As a result thereof, when the tab is bent downwardly at a right angle with respect to the nut, the outer side edges of the bifurcated portion in the width direction thereof come into contact with portions of the inner periphery of the nut insertion hole located at a slightly lower level than the above horizontal line. Thereafter, when the tab is folded downwardly to be superposed on the outer surface of the hollow member, both side edges of the bifurcated portion can be strongly wedged against the inner periphery of the nut insertion hole.

According to the present invention, since the transverse width of the bifurcated portion of the tab is larger than the transverse width of the nut, and thus the outer side edges of the bifurcated portion in the width direction thereof come into contact with the inner periphery of the nut insertion hole, the difference between the diameter of the nut insertion hole and the transverse width of the bifurcated portion is small. As a result thereof, when the nut is located inside of the inner surface of the hollow member by folding the tab downwardly so as to be superposed on the outer surface of the hollow member, both side edges of the bifurcated portion are strongly wedged against the inner periphery of the nut insertion hole. In this way, it is possible to firmly (unmovably) attach the nut to the inner surface of the hollow member, and thus to stabilize the position of the nut. As a result thereof, it is possible to easily screw a bolt into the threaded hole, and thus to increase work efficiency.

By narrowing the difference between the diameter of the nut insertion hole and the transverse width of the bifurcated portion of the tab, when the nut is attached to the inner surface of the hollow member, it is possible to align the threaded hole of the nut with the nut insertion hole of the hollow member without excessively pulling the nut downwardly. Therefore, it is possible to accurately fix, e.g., a component to a predetermined portion of the hollow member in the height direction thereof.

DETAILED DESCRIPTION OF THE PREFERRED EMBODIMENT(S)

Figure 1:
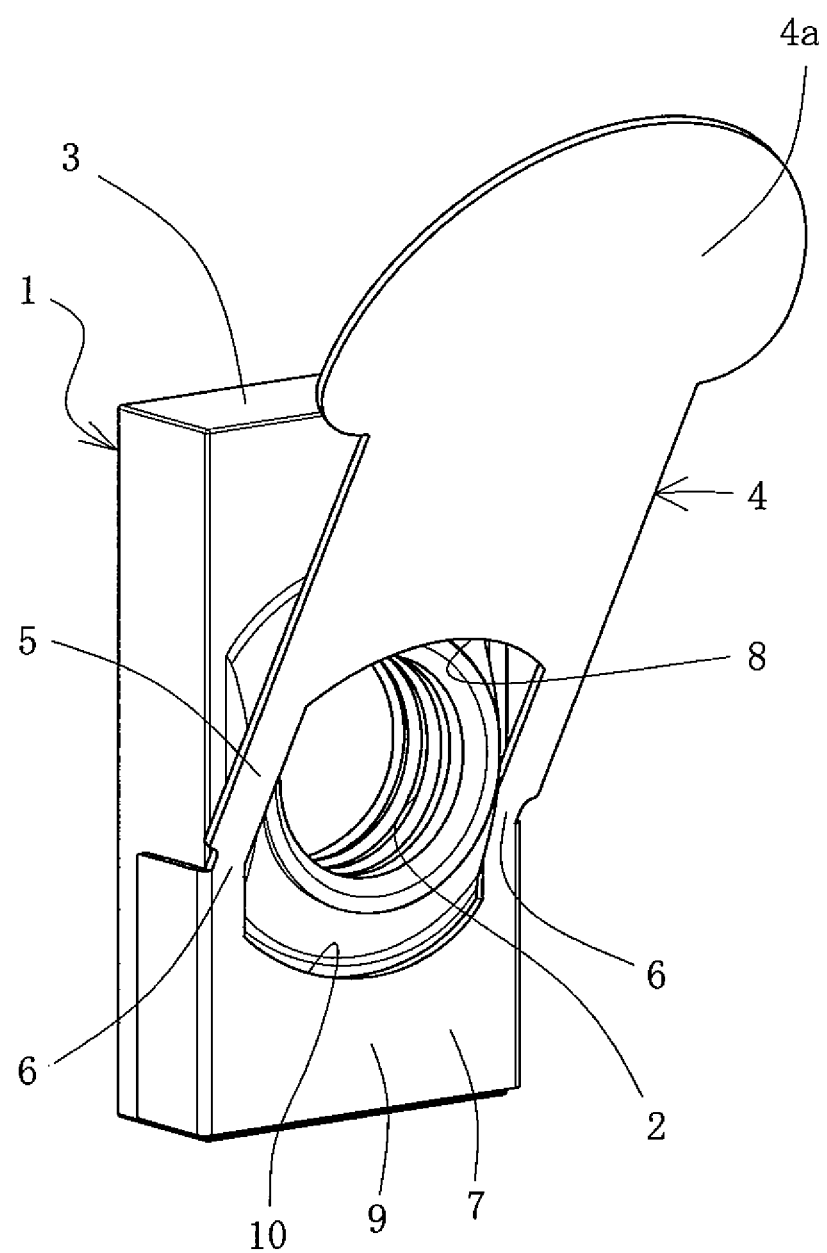
FIG. 1 is a perspective view of a plate nut assembly according to the present invention.

The embodiment of the present invention is now described with reference to FIGS. 1 to 5.

As illustrated in FIGS. 1 to 4, a plate nut assembly 1 according to the present invention comprises a vertically elongated rectangular nut 3 having, at the central portion thereof, a threaded hole 2 extending through the nut 3 in the thickness direction thereof; and a tab 4 located on one surface of the nut 3. The plate nut assembly 1 is configured such that by inserting the nut 3 through a nut insertion hole b formed in a hollow member a, from its outer end lying on the outer surface of the hollow member a, until the entire nut 3 is located inside of the inner surface of the hollow member a, and folding the tab 4 such that the tab 4 is superposed on the outer surface of the hollow member a, the nut 3 is attached to the inner surface of the hollow member a.

The tab 4 is formed of a single strip-shaped metal plate such as stainless steel, and comprises a bifurcated portion 5 disposed at its central portion, and having arms defining therebetween a U-shaped opening 8 disposed so as to expose the threaded hole 2; a wide grip portion 4a connected to the proximal end of the bifurcated portion 5; and a fixed portion 7 integrally connected to the distal ends of the arms of the bifurcated portion 5 through foldable portions 6, and fixed to the nut 3 such that the longitudinal direction of the tab 4 coincides with the longitudinal direction of the nut 3.

The fixed portion 7 has the shape of a Japanese character "⊐", and is fixedly fitted to the front surface and two side surfaces of the nut 3 at one longitudinal end of the nut 3, i.e., at its lower end. The fixed portion 7 includes a top plate 9 having a U-shaped cutout 10 disposed at the end of the top plate 9 close to the threaded hole 2 so as to expose the threaded hole 2, and defining, on both sides of the cutout 10, two distal ends of the top plate 9 that are integrally connected to the distal ends of the respective arms of the bifurcated portion 5 through the foldable portions 6. The tab 4 is fixed at its fixed portion 7 to the nut 3 with the bifurcated portion 5 and the grip portion 4a not fixed to the nut 3.

Figure 4:
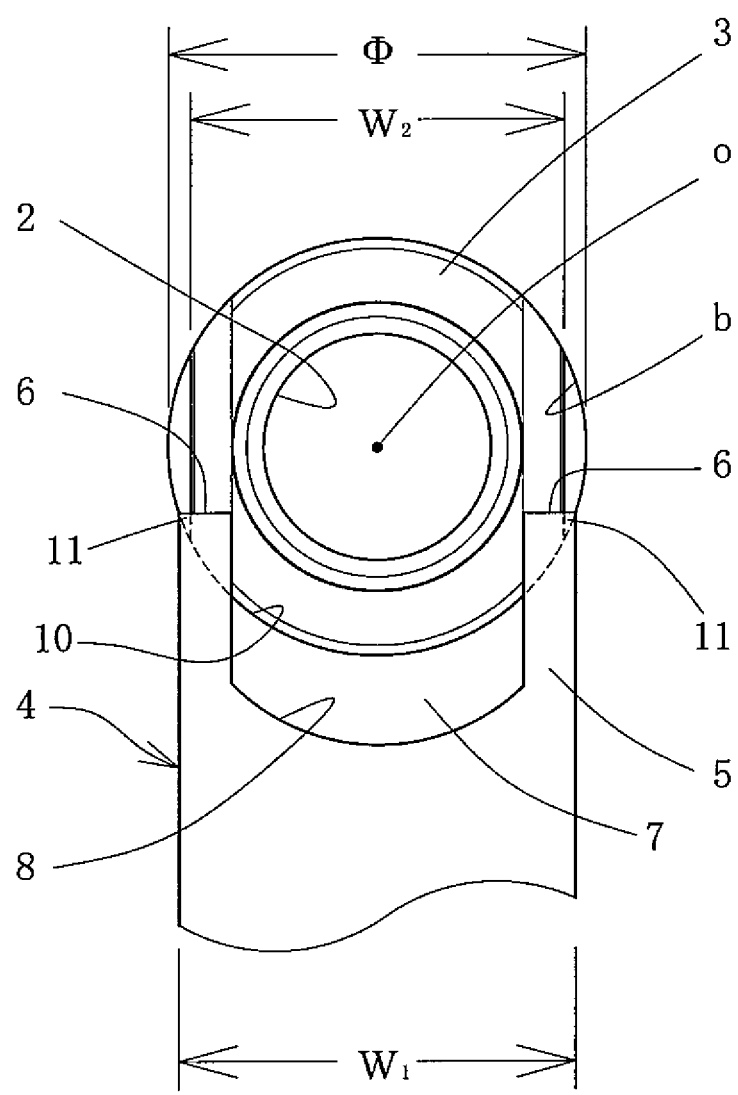
FIG. 4 is an enlarged front view of a portion of the plate nut assembly in the state of FIG. 3.

As illustrated in FIG. 4, the width (i.e., the dimension in the transverse direction perpendicular to the longitudinal direction) $W_1$ of the bifurcated portion 5 of the tab 4 is larger than the width $W_2$ of the nut 3, and is smaller than the diameter φ of the nut insertion hole b of the hollow member a. The plate nut assembly 1 is configured such that, with the nut 3 inserted through the nut insertion hole b of the hollow member a until the nut 3 is located inside of the inner surface of the hollow member a, and with the center of the threaded hole 2 substantially coinciding with the center O of the nut insertion hole b, the foldable portions 6 are located at a slightly lower level than the horizontal (diametrical) line that passes through the center O of the nut insertion hole b.

Since, in the shown example, the fixed portion 7 is a "⊐"-shaped portion fitted to the outer periphery of the nut 3, the transverse width of the fixed portion 7 is larger than the width $W_2$ of the nut 3 by twice the wall thickness of the fixed portion 7. On the other hand, the width $W_1$ of the bifurcated portion 5, which is set based on the width $W_2$ of the nut 3, is smaller than the diameter φ of the nut insertion hole b of the hollow member a, but is larger than the transverse width of the fixed portion 7. Thus, the difference between the diameter p of the nut insertion hole b and the width $W_1$ of the bifurcated portion 5 is small.

Figure 5:
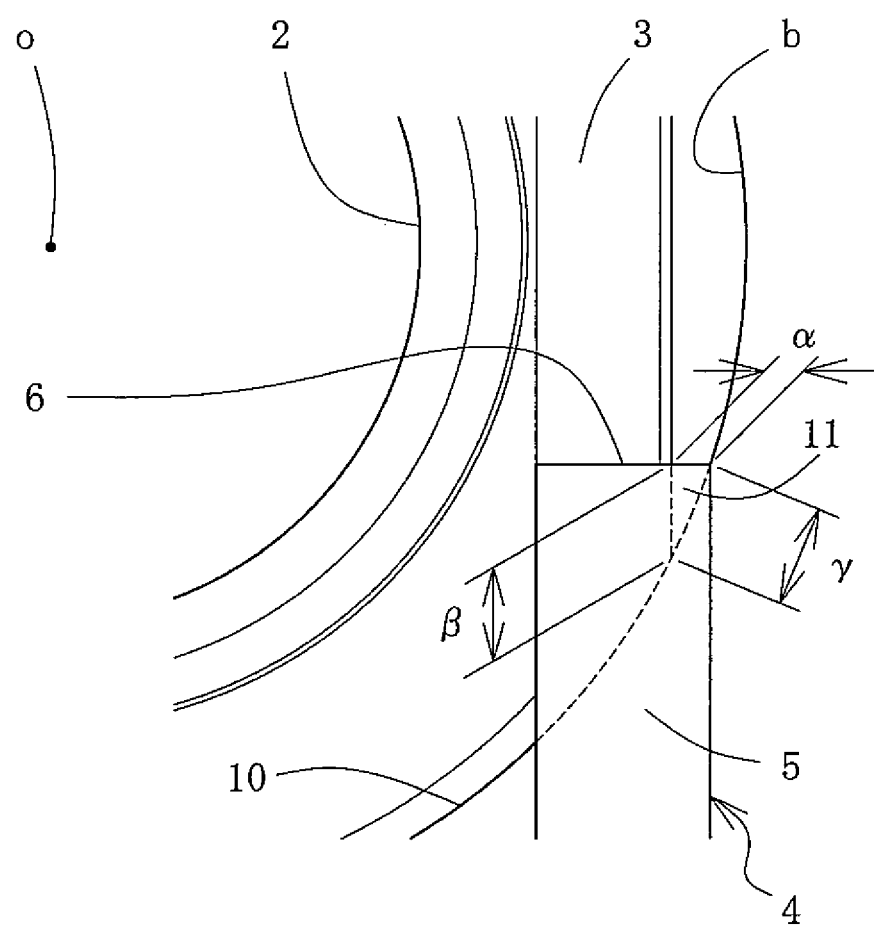
FIG. 5 is a further enlarged front view illustrating the positional relationship between the bifurcated portion of the tab and the nut insertion hole of the hollow member.

FIGS. 4 and 5 are enlarged views illustrating the positional relationship of the bifurcated portion 5 of the tab 4 with the nut insertion hole b of the hollow member a; and the relationship between the width $W_2$ of the nut 3 and the width $W_1$ of the bifurcated portion 5. For convenience in describing the present invention, FIGS. 4 and 5 show, as seen from the outer side of the hollow member a, the positional relationships among the nut insertion hole b of the hollow member a, the nut 3, and the tab 4, when the nut 3 is inserted through the nut insertion hole b, and brought into abutment with the inner surface of the hollow member a, and the tab 4 is then folded downwardly at the foldable portions 6 so as to be superposed on the outer surface of the hollow member a.

The bifurcated portion 5 of the tab 4 includes protruding portions 11 each protruding outwardly beyond the side edge of the nut 3 by a protruding amount α which is equal to half the difference between the width $W_1$ of the bifurcated portion 5 of the tab 4 and the width $W_2$ of the nut 3. With the tab 4 attached to the nut insertion hole b, each side edge of the nut 3 intersects with the inner periphery of the nut insertion hole b of the hollow member a at a first point where the tab 4 is fixed to the nut 3, see FIG. 5, and at a second point (not shown) where the tab 4 is not fixed to the nut 3, and the protruding amount α satisfies the relation 1.5α≤ß, where ß is the distance between the above-described first point and the corresponding one of the positions at which the tab 4 is folded.

Further, the protruding amount α satisfies the relation 2α≤r, where r is the linear distance between the above-described first point and the position at which the side edge of the bifurcated portion 5 of the tab 4 comes into contact with the inner periphery of the nut insertion hole b.

A plurality of plate nut assemblies 1 as described above which have threaded holes 2 different in diameter from each other, and thus are different in size from each other are actually prepared such that any of components different in size and weight from each other can be fixed to the hollow member a by use of a selected one of the plate nut assemblies 1. For the plate nut assemblies 1, the larger the diameters of the threaded holes 2 are, the larger the widths of the nuts 3 are. However, for any of the plate nut assemblies 1 different in size from each other, the width $W_2$ of the nut 3 is set to be as small as possible with respect to the diameter φ of the nut insertion hole b of the hollow member a, provided that the strength of the nut 3 is maintained, so that the diameter φ of the nut insertion hole b is small.

Namely, when the nut insertion hole b is formed in the hollow member a by a drill or by pressing, the diameter of the nut insertion hole b is set in accordance with the width $W_2$ of the nut 3 of the plate nut assembly 1 to be used. For example, if the plate nut assembly 1 has a size used widely, the relationship between the width $W_2$ of the nut 3 and the diameter φ of the nut insertion hole b is set such that the diameter φ is larger than the width $W_2$ by 0.5 mm to 0.8 mm, and if the plate nut assembly 1 has a large size, the above relationship is set such that the diameter φ is larger than the width $W_2$ by about 1.2 mm. Also, for any of the plate nut assemblies 1 different in size from each other, the width $W_1$ of the bifurcated portion 5 of the tab 4 is determined taking into consideration the diameter φ of the nut insertion hole b, i.e., set to be smaller than the diameter φ of the nut insertion hole b and larger than the width $W_2$ of the nut 3.

For any of the plate nut assemblies 1 different in size from each other, since the diameter of the nut insertion hole b is set with respect to the width $W_2$ of the nut 3, and the width w1 of the bifurcated portion 5 of the tab 4 is larger than the width $W_2$ of the nut 3 and smaller than the diameter of the nut insertion hole b, by pulling the tab 4 obliquely downwardly with the nut 3 located inside of the inner surface of the hollow member a, both side edges of the bifurcated portion 5 of the tab 4 come into contact with portions of the inner periphery of the nut insertion hole b at a slightly lower level than the center O of the nut insertion hole b.

By, as described above, setting the relationship between the width $W_1$ of the bifurcated portion 5 of the tab 4 and the contact positions at which the bifurcated portion 5 comes into contact with the nut insertion hole b, when the nut 3 is inserted through the nut insertion hole b of the hollow member a until the nut 3 is located inside of the inner surface of the hollow member a, with the center of the threaded hole 2 substantially coinciding with the center O of the nut insertion hole b, the bifurcated portion 5 is located at an only slightly lower level than the horizontal (diametrical) line passing through the center O of the nut insertion hole b. That is, since the width $W_1$ of the tab 4 is larger than the widths of conventional tabs, the bifurcated portion 5 comes into contact with the nut insertion hole b at positions closer to the horizontal line passing through the center of the nut insertion hole, so that both side edges of the bifurcated portion 5 of the tab 4 can be sufficiently wedged against the inner periphery of the nut insertion hole b, and thus the nut 3 can be attached to the hollow member a in a stable manner.

Figure 2:
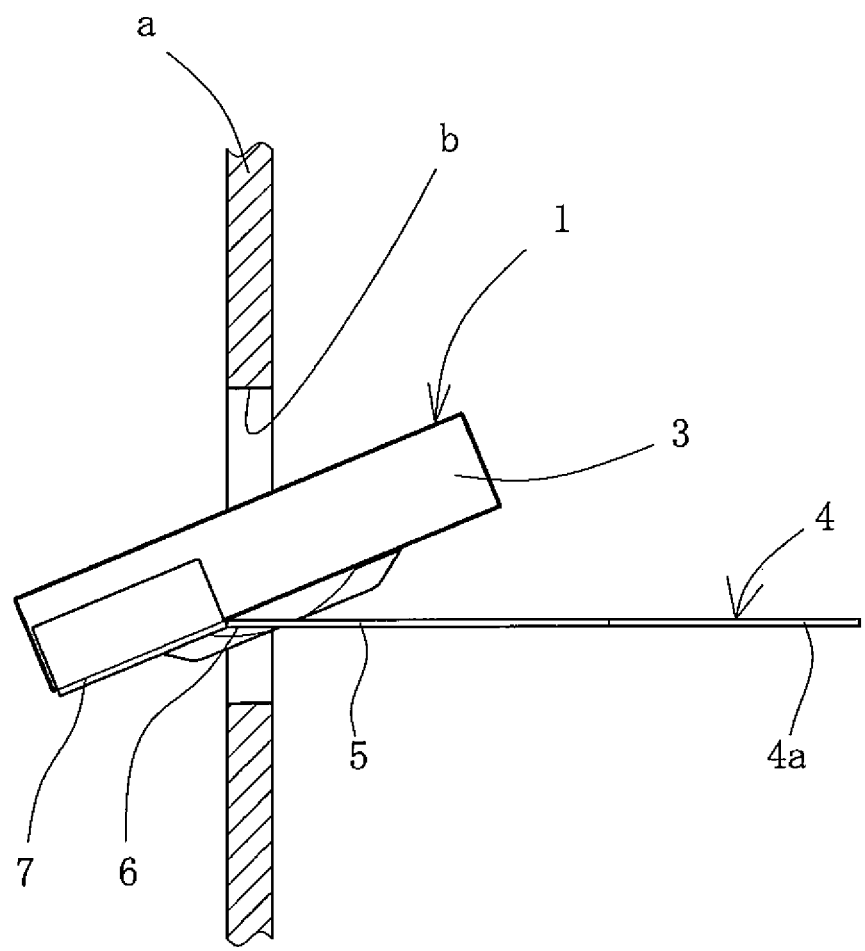
FIG. 2 is a vertical sectional side view illustrating the step of attaching the plate nut assembly of the present invention to a hollow member with a portion of the plate nut assembly inserted through the nut insertion hole of the hollow member.
Figure 3:
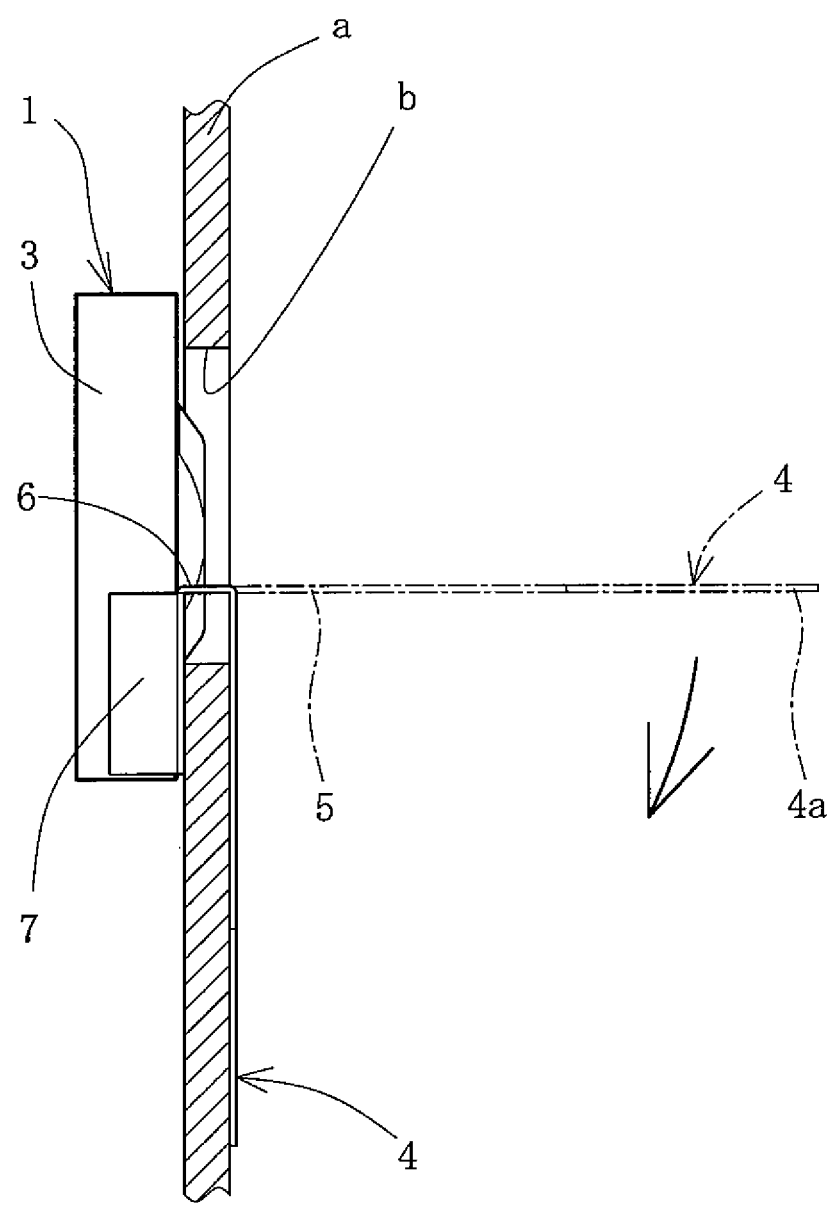
FIG. 3 is a vertical sectional side view illustrating the step of attaching the plate nut assembly of the present invention to the hollow member with the nut of the plate nut assembly attached to the inner surface of the hollow member by folding the tab of the plate nut assembly so as to be superposed on the outer surface of the hollow member.

The above-described plate nut assembly 1 of the present invention is used as described below. In accordance with the size of the plate nut assembly 1 to be used, a user forms, in the hollow member a, a nut insertion hole b having a diameter larger than the transverse width of the nut 3; picks up the plate nut assembly 1 by holding, with fingertips, the grip portion 4a of the tab 4, which is inclined slightly relative to the longitudinal direction of the nut 3; inserts, as illustrated in FIG. 2, the nut 3 through the nut insertion hole b from its outer end lying on the outer surface of the hollow member a with the nut 3 substantially horizontally directed on the tab 4 until the entire length of the nut 3 is located inside of the inner surface of the hollow member a; pulls the tab 4 slightly upwardly until the upper end of the nut 3 comes into abutment with a portion of the inner surface of the hollow member a above the nut insertion hole b; and pulls the tab 4 in the horizontal direction until, as illustrated in FIG. 3, the upper and lower ends of the nut 3 abut, respectively, portions of the inner surface of the hollow member a above and below the nut insertion hole b. with the tab 4 bent at a right angle with respect to the nut 3 at the foldable portions 6. Thereafter, the user folds the tab 4 downwardly until the tab 4 is superposed on the outer surface of the hollow member a.

When the tab 4 is bent at a right angle with respect to the nut 3 by horizontally pulling the tab 4, both side edges of the bifurcated portion 5 are wedged against, i.e., brought into pressure contact with, respective side portions of the inner periphery of the nut insertion hole b. Thereafter, by folding the tab 4 downwardly until the tab 4 is superposed on the outer surface of the hollow member a, the hollow member a is sandwiched in the thickness direction thereof by the nut 3 and the tap 4, so that the plate nut assembly 1 is attached to the hollow member a.

Since the transverse width of the bifurcated portion 5 of the tab 4 is larger than the transverse width $W_2$ of the nut 3, and as a result, both side edges of the bifurcated portion 5 come into contact with the inner periphery of the nut insertion hole b at positions closer, compared to conventional tabs, to the horizontal (diametrical) line passing through the center O of the nut insertion hole b, both side edges of the bifurcated portion 5 can be strongly wedged against the inner periphery of the nut insertion hole b. Therefore, the tab 4 is less likely to move in either of the circumferential direction of the nut insertion hole b and the width direction of the tab 4, so that the nut 3 is firmly (unmovably) fixed in position with the center of the threaded hole 2 of the nut substantially coinciding with the center of the nut insertion hole b.

Thereafter, by placing, e.g., a component onto the outer surface of the hollow member a, and screwing a bot through the component into the threaded hole 2 of the nut 3, the component is fixed to the hollow member a. Since the nut 3 is firmly (unmovably) attached to the hollow member a, it is possible to smoothly screw a bolt through the component into the threaded hole. Also, since the nut 3 is attached to the hollow member a with the center of the threaded hole 2 substantially coinciding with the center of the nut insertion hole b, it is possible to accurately fix the component to a predetermined portion of the hollow member a in the height direction thereof.

The invention claimed is:

1. A plate nut assembly comprising:
   a nut in a shape of a plate having long sides and short sides, and including, at a central portion of the nut, a threaded hole extending through the nut in a thickness direction of the nut; and
   a tab located on one surface of the nut, the tab including:
   a bifurcated portion disposed at a central portion of the tab, and having distal ends on two sides of the bifurcated portion; and
   a fixed portion integrally connected to the distal ends of the bifurcated portion,
   and fixed to portions of the nut on two opposite sides of the threaded hole in a transverse width direction of the nut,
   wherein the plate nut assembly is configured such that, by (i) inserting the nut through a nut insertion hole formed in a hollow member, the nut insertion hole having a diameter smaller than a length of the nut and larger than a transverse width of the nut;
   and (ii) bending the tab, the nut can be located inside of an inner surface of the hollow member with the threaded hole opposed to the nut insertion hole,
   wherein a transverse width of the bifurcated portion of the tab is larger than the transverse width of the nut,
   wherein the plate nut assembly is configured such that, when the nut is inserted through the nut insertion hole of the hollow member until the nut is located inside of the inner surface of the hollow member, two side edges of the bifurcated portion in a transverse width direction of the bifurcated portion come into contact with an inner periphery of the nut insertion hole, wherein the bifurcated portion includes protruding portions including the two side edges of the bifurcated portion, each of the protruding portions protruding outwardly beyond a respective side edge of the nut by a protruding amount $\alpha$, the protruding amount $\alpha$ being equal to half a difference between the transverse width of the bifurcated portion and the transverse width of the nut, wherein the plate nut assembly is configured such that, with the tab attached to the nut insertion hole, the respective side edge of the nut intersects with the inner periphery of the nut insertion hole at a predetermined point where the tab is fixed to the nut.

2. The plate nut assembly according to claim 1, wherein the protruding amount a satisfies a relation $1.5\alpha<\beta$, where $\beta$ is a distance, in plan view seen from a thickness direction of the hollow member, between the predetermined point and a corresponding one of two positions of the tab at which the tab is folded.

3. The plate nut assembly according to claim 2, wherein the protruding amount $\alpha$ satisfies a relation $2\alpha \leq \Gamma$, where $\Gamma$ is a linear distance, in plan view seen from a thickness direction of the hollow member, between the predetermined point and a position at which a corresponding one of the two side edges of the bifurcated portion comes into contact with the inner periphery of the nut insertion hole.

4. The plate nut assembly according to claim 1, wherein the protruding amount $\alpha$ satisfies a relation $2\alpha<\Gamma$, where $\Gamma$ is a linear distance, in plan view seen from a thickness direction of the hollow member, between the predetermined point and a position at which a corresponding one of the two side edges of the bifurcated portion comes into contact with the inner periphery of the nut insertion hole.

* * * * *